United States Patent [19]

Gilhousen

[11] Patent Number: 5,559,865
[45] Date of Patent: * Sep. 24, 1996

[54] AIRBORNE RADIOTELEPHONE COMMUNICATIONS SYSTEM

[75] Inventor: Klein S. Gilhousen, Bozeman, Mont.

[73] Assignee: QUALCOMM Incorporated, San Diego, Calif.

[*] Notice: The term of this patent shall not extend beyond the expiration date of Pat. No. 5,519,761.

[21] Appl. No.: 272,060

[22] Filed: Jul. 8, 1994

[51] Int. Cl.$^6$ ..................................................... H04Q 7/20
[52] U.S. Cl. ........................ 379/60; 455/33.2; 455/11.1
[58] Field of Search .................................... 379/57, 58, 59, 379/63, 60; 455/33.1, 54.1, 56.1, 62, 11.1, 33.4, 33.2, 54.2; 375/205

[56] References Cited

U.S. PATENT DOCUMENTS

| | | | |
|---|---|---|---|
| 4,249,181 | 2/1981 | Lee | 343/100 |
| 4,419,766 | 12/1983 | Goeker et al. | 455/62 |
| 4,607,389 | 8/1986 | Halgrimson | 455/11 |
| 5,067,172 | 11/1991 | Schloemer | 455/54.1 |
| 5,073,900 | 12/1991 | Mallinckrodt | 379/59 X |
| 5,123,112 | 6/1992 | Choate | 455/56.1 |
| 5,408,515 | 4/1995 | Bhagat et al. | 455/33.1 |
| 5,444,762 | 8/1995 | Frey et al. | 379/58 |

FOREIGN PATENT DOCUMENTS

WO94/05129  3/1994  WIPO ............................. H04Q 7/04

OTHER PUBLICATIONS

*Ericsson Review*, "The Future of Cellular Telephony", Hakan Jansson et al., No. 1 1990 vol. 67.
Telcom Report International 15, "Third Generation Mobile Communications", Dr. Heinrich Armbruster, (1992) No. 3–4, pp. 18–21.
IEEE publication entitled "Prodat Aeronautical Communication System Overall Architecture and Preliminary Test Results" by Rogard et al., 1987 pp. 15.5.1—15.5.15.5.7.
Publication entitled "Terrestrial Flight Telephone System: Integration Issues for a Pan–European Network" by G. D'Aria et al., presented at Fifth Nordic Seminar on Digital Mobile Radio Communications in Helsinki Finland 1–3 Dec. 1992, pp. 123–130.
Publication entitled "Terrestrial Flight Telephone System for Aeronautical Public Correspondence: Overview and Handover Performance" by E. Berruto et al., presented at 11312 MRC Mobile Radio Conference, 13–15 Nov., 1991 in Nice France, pp. 221–228.
IEEE publication entitled "The Provision of GSM Cellular Radio Environments Within Passenger Aircraft Operating Over Europe" by I. E. Casewell, Racal Research Limited, at 5th International Conference on Mobile Radio and Personal Communications, Dec. 11–14, 1989, pp. 172–176.

*Primary Examiner*—Curtis Kuntz
*Assistant Examiner*—William G. Trost
*Attorney, Agent, or Firm*—Russell B. Miller; Roger W. Martin

[57] ABSTRACT

The airborne communication system enables one or more radiotelephones to communicate with a ground based cellular radiotelephone system. In the preferred embodiment, the aircraft is equipped with a repeater that relays a signal from the airborne radiotelephone to the ground base station and vice versa. Alternate embodiments use an airborne base station to register the radiotelephones before registering them with the ground system. Alternately, the antennas on the ground could be used to form aerial cell sites by pointing the antennas upward to where the aircraft flies through the cells. The system of the present invention provides the additional benefit of enabling the ground based cellular radio systems to source a call to the aircraft radiotelephone.

7 Claims, 3 Drawing Sheets 5,559,865

AIRBORNE RADIOTELEPHONE COMMUNICATIONS SYSTEM

BACKGROUND OF THE INVENTION

1. Field of the Invention

The present invention relates to the field of communications. More particularly, the present invention relates to cellular radiotelephone communications between an airplane and a ground based station.

2. Description of the Related Art

Present communications technology enables aircraft passengers to make telephone calls to anywhere in the world from any properly equipped airplane. Large airline-type aircraft as well as smaller general aviation-type aircraft can be equipped with the radiotelephone equipment.

A radiotelephone conversation is typically accomplished by first entering the telephone number to be called as well as credit card information to pay for the call. The radiotelephone then connects with one of 70–80 radiotelephone base stations, also known as cells, on the ground. The cell to which it connects depends on to which base station the aircraft is closest when the call is initiated. The cells, each connected to the public switched telephone network (PSTN), cover most of the continental United States, thus allowing a telephone call to be initiated from an aircraft almost anywhere.

Aircraft radiotelephones, however, experience a number of problems. First, the aircraft based radiotelephone does not register in the ground based system. The ground based system, therefore, does not know the location of the aircraft radiotelephone. This restricts the aircraft radiotelephone to initiating calls; it cannot receive calls since the ground system does not know where to forward calls.

Another problem is that the aircraft radiotelephone system does not perform hand-offs between cells as is done in ground based cellular radiotelephone systems when the radiotelephone reaches the edge of the cell. This results in the call from the aircraft radiotelephone being dropped when the aircraft reaches the limit of the cell's coverage. There is a resulting need for an airborne radiotelephone system that is compatible with the ground based cellular radiotelephone system. In other words, an airborne radiotelephone system is needed that enables ground initiated telephone calls to be received by the airborne radiotelephone in addition to the call from the airborne radiotelephone being handed off to the next cell as it reaches the edge of the cell's coverage.

SUMMARY OF THE INVENTION

The radio communications system of the present invention encompasses a ground based subsystem and an airborne based subsystem. The ground based subsystem is comprised of a base station for transmitting land originated signals and receiving repeated signals from the airborne subsystem. The base station is coupled to a public switched telephone network (PSTN). The airborne based subsystem is comprised of an airborne wireless radio for transmitting and receiving signals and an airborne wireless repeater for repeating the signals to the base station.

DETAILED DESCRIPTION OF THE PREFERRED EMBODIMENT

Figure 1:
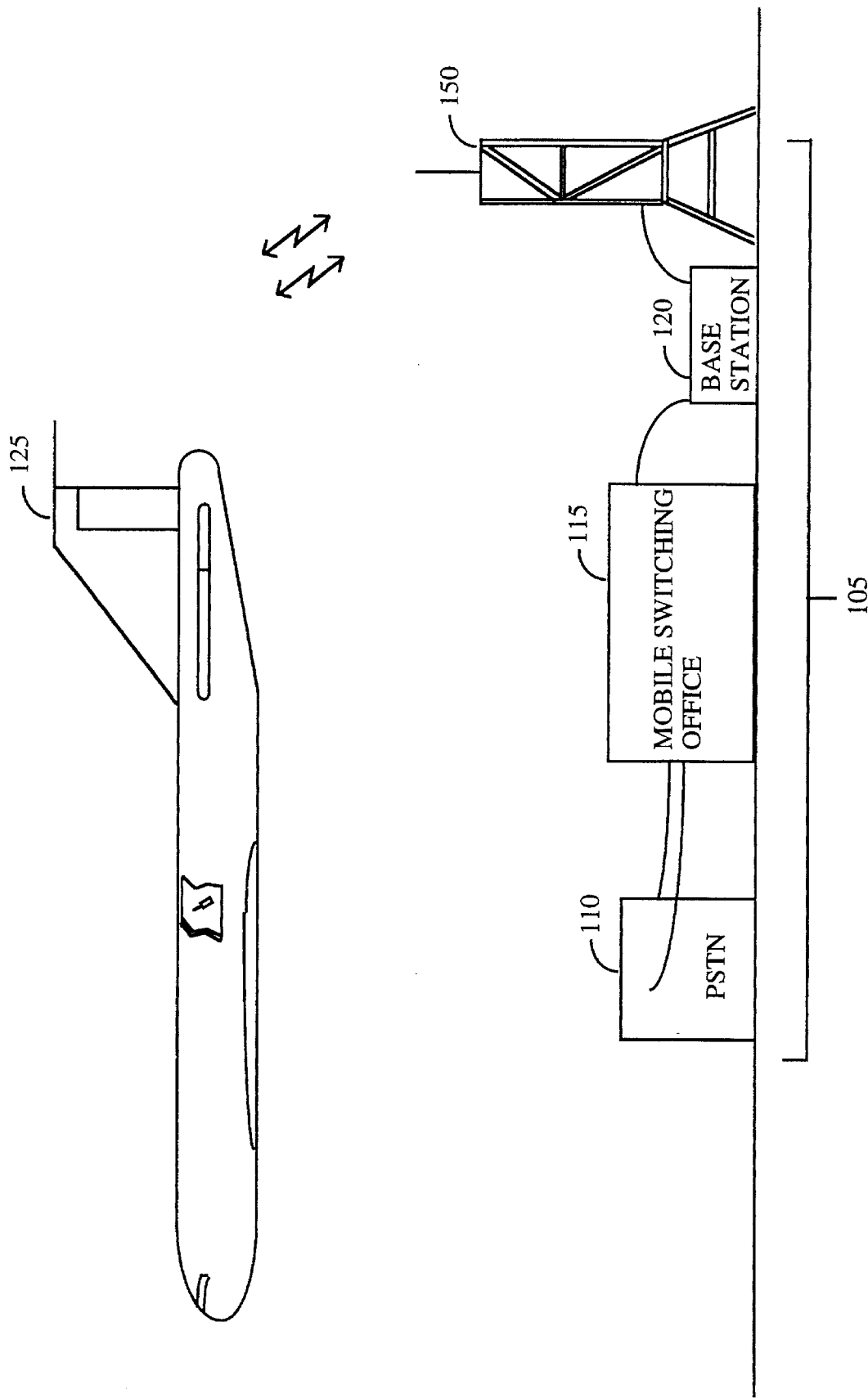
FIG. 1 shows the airborne radiotelephone communications system of the present invention.

The airborne radiotelephone communication system of the present invention is illustrated in FIG. 1. This system is comprised of two subsystems: the ground based subsystem (105) and the airborne based subsystem (125).

The ground based subsystem (105), in the preferred embodiment, is the code division multiple access (CDMA) cellular radiotelephone system. An alternate embodiment uses the time division multiple access system. Another alternate embodiment uses the present advanced mobile phone system (AMPS). A typical CDMA radiotelephone system is discussed in greater detail in U.S. Pat. No. 4,901,307 to Gilhousen et al. and assigned to Qualcomm, Inc.

The ground based radiotelephone system is comprised of a base station (120), also known as a cell site, coupled to a mobile switching center (115) that is coupled to the public switched telephone network (PSTN) (110). The base station (120) communicates with the mobile radiotelephones and switches the signals from the radiotelephones to the mobile switching center (115). The base station (120) also provides the proper channels to the radiotelephone, thus enabling communication with the base station. The mobile switching center (115) switches the signals from the base station (120) to the PSTN (110) and vice versa.

Each base station (120) is coupled to an antenna (150) that receives and radiates the CDMA radiotelephone signals. In the preferred embodiment, the antenna (150) is identical to typical cell site antennas that are well known to one skilled in the art. An alternate embodiment uses an antenna that radiates upward. This upward radiation forms a cell that is elevated above the ground allowing the airborne radiotelephone to travel through the elevated cells in the same manner that a mobile radiotelephone on the ground travels through terrestrial cells. An antenna that forms this type of elevated cell is a typical directional antenna that is well known in the art.

Figure 2:
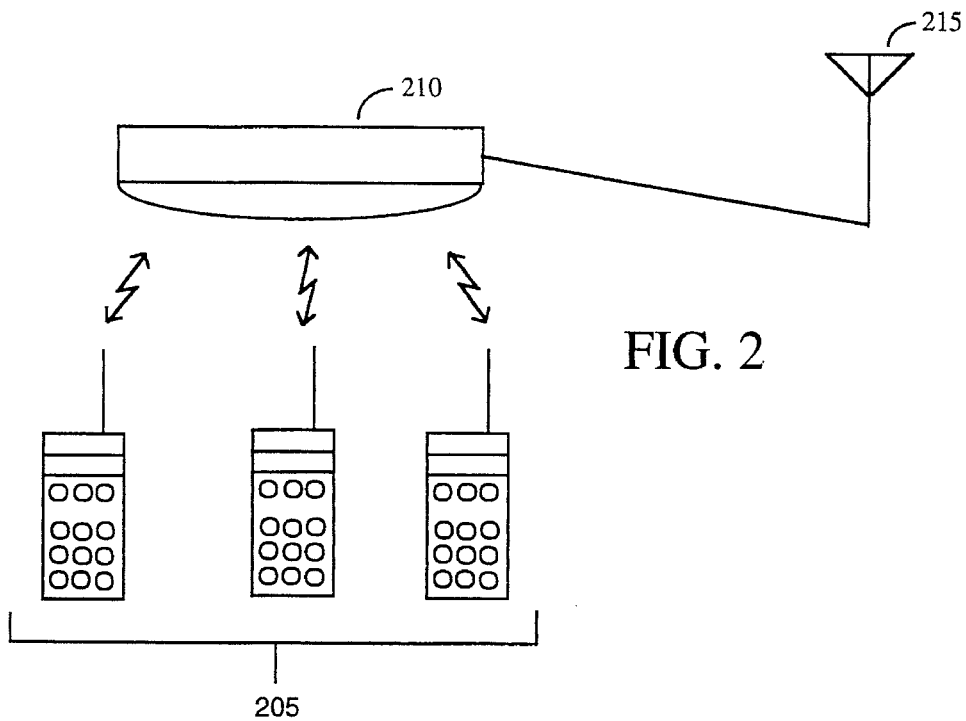
FIG. 2 shows the airborne based subsystem of the present invention.

A block diagram of the airborne based subsystem of the present invention is illustrated in FIG. 2. This subsystem uses a CDMA-type radiotelephone (205) to communicate with a radiotelephone signal repeater (210), having an antenna, that is located in the aircraft. In the preferred embodiment, the repeater (210) also has an amplifier to increase the signal's gain that is being communicated to the repeater.

The repeater (210) receives the signals from the individual radiotelephones (205) within the aircraft and relays them to an antenna (215) mounted on the outside of the aircraft. The outside antenna (215) relays the signals to the base station on the ground. This subsystem may have a single radiotelephone, as in a small aircraft, or multiple radiotelephones, as in an airline size aircraft.

The airborne subsystem also operates in the reverse direction. Telephone calls from the PSTN to the base station on the ground are transmitted to the outside antenna (215) that relays them to the repeater (210) mounted in the aircraft. The repeater's antenna communicates the signal to the proper radiotelephone (205) in the aircraft. The radiotelephones (205) determine which signal is to be decoded by the process described in Gilhousen et al. and in the Telecommunications Industries Association/Electronic Industries Association Interim Standard 95 (TIA/EIA/IS-95).

Figure 3:
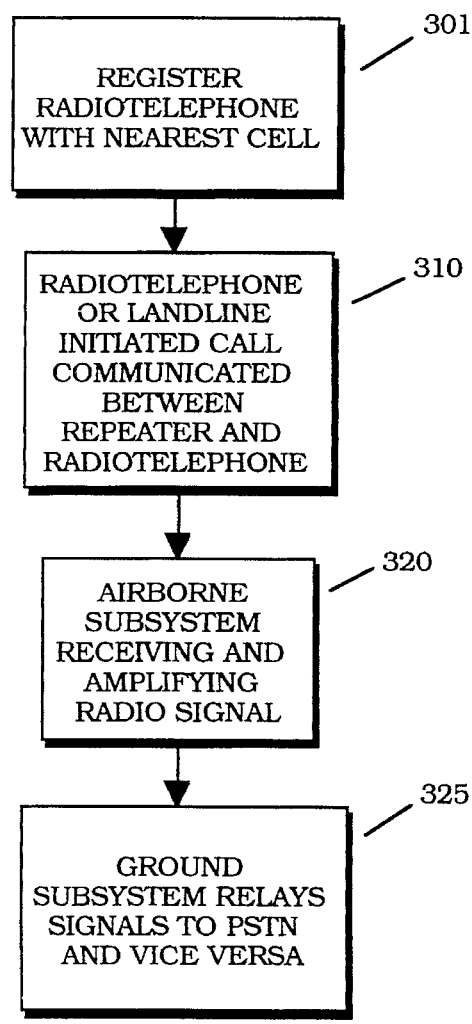
FIG. 3 shows a flowchart of the process of the present invention.

In an alternate embodiment, the radiotelephone signal repeater is replaced by an airborne base station that has the ability to register the radiotelephones on the aircraft. The airborne base station then registers the radiotelephone with the ground based subsystem. This base station has the same functionality of its ground-based counterpart but on a much smaller scale since it does not have to handle the thousands of radiotelephones of the ground-based station The airborne communications system of the present invention operates in a similar way to the ground based CDMA radiotelephone system discussed in Gilhousen et al. A flowchart of this operation is illustrated in FIG. 3.

The process begins by the airborne repeater registering the radiotelephone with the nearest cell site (301). This is accomplished in the same manner as a terrestrial radiotelephone registers with the ground based radiotelephone system; the repeater searches for the strongest pilot signal and registers with that cell. This registration process involves the radiotelephone's telephone number and electronic serial number being transmitted to the base station. The registration process is described in greater detail in U.S. Pat. No. 5,289,527 to Tiedemann and assigned to Qualcomm, Inc.

The radiotelephone or ground-based landline telephone system can now initiate a call (310). The call from the radiotelephone is received by the airborne repeater and amplified (320) before being transmitted to the ground base station. The ground base station then transmits the call to the mobile switching center that routes the call to the PSTN where it is then connected to the called telephone number (325).

The signals from the PSTN to the airborne radiotelephone are routed in the reverse of the radiotelephone initiated call. The mobile switching center switches the call to the base station to which the radiotelephone is registered. The base station then transmits the signal (325) to the airborne external antenna that relays it to the aircraft repeater (320). The repeater amplifies it and transmits the amplifier signal to the radiotelephone in the aircraft.

The present invention also enables a ground telephone or radiotelephone to contact an airborne radiotelephone. Since the repeater has registered the airborne radiotelephone with the proper ground base station, the mobile switching center knows to which base station the call is to be routed. Once the call is routed to the proper base station it is transmitted to the airborne repeater which then amplifies the call and transmits it to the radiotelephones on the aircraft. As discussed above, the radiotelephones then determine which signal is to be decoded.

Another benefit of the present invention is the hand-off capability. Once the aircraft reaches the fringe of the present cell site, the radiotelephone begins the hand-off process described in Tiedemann. The signals from the ground base stations are received by the external antenna of the airborne subsystem and repeated to the radiotelephones. This enables the radiotelephones to search for the strongest pilot signal of the next cell and register with that base station. The determining factor on when the quality of the pilot signal has been reduced to the point that a hand-off is required is when the pilot signal drops a predetermined amount. This amount may be different for every system and is set to optimize the system performance.

Figure 4:
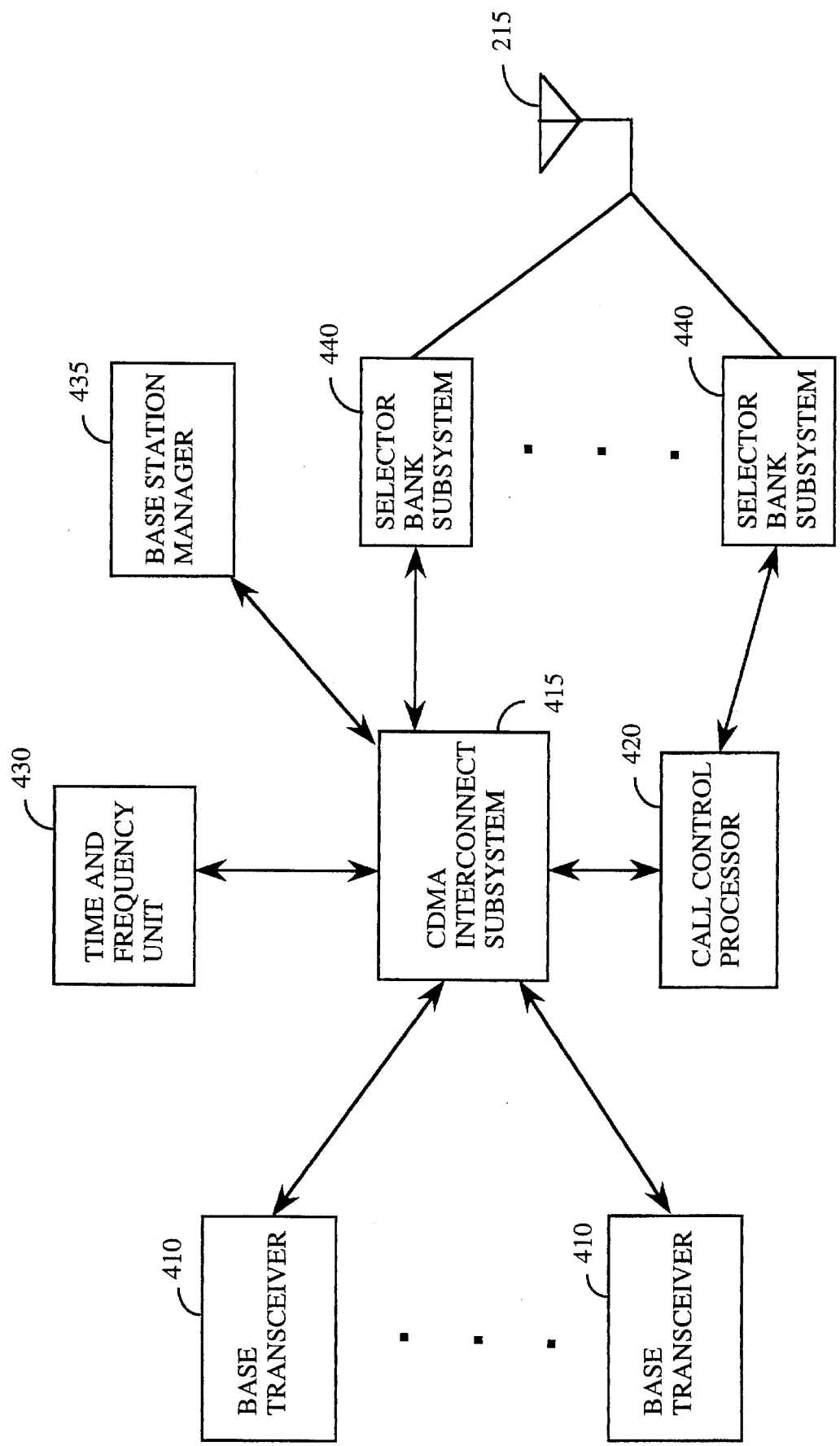
FIG. 4 shows a block diagram of an alternate embodiment of the present invention.

In the alternate embodiment, the airborne repeater is replaced by a base station-type unit that registers the radiotelephone aboard the aircraft. A block diagram of the airborne base station is illustrated in FIG. 4. Once the radiotelephone is registered with the aircraft base station, the aircraft base station then searches for the strongest pilot signal from a ground base station and registers with that base station.

Referring to FIG. 4, the airborne base station is comprised of a number of base station transceivers (410) that are the link between the radiotelephone and the base station. The CDMA interconnect subsystem (415) routes the signals between the transceivers (410) and the rest of the base station. The call control processor (420) controls signaling with the radiotelephones, controls all call processing, and allocates the base station resources. The time and frequency unit (430) provides the timing and frequency signals for the base station. The base station manager (435) performs initialization, configuration, and performance management of the base station. And finally, the selector bank subsystems (440) processes and formats the data between the ground base stations and the radiotelephone. The selector bank subsystems (440) are connected to the aircraft's external antenna (315) to receive and radiate the radiotelephone signals.

Other embodiments using the airborne base station may have different components and different features. A base station that simply registers the radiotelephone and relays this registration to the ground base station is also within the scope of the present invention.

I claim:

1. A communications system comprising:

a code division multiple access (CDMA) ground based subsystem comprising:

a plurality of base stations for transmitting communication signals having a quality level and receiving radio signals from an airborne based subsystem, the plurality of base stations being coupled to a public switched telephone network (PSTN);

the airborne based subsystem for transmitting the radio signals to, and receiving the communication signals from, a first base station of said plurality of base stations, and if the quality level of said first base station's communication signal is less than a predetermined amount, transmitting the radio signals to, and receiving the communication signals from, a second base station of said plurality of base stations, the airborne based subsystem comprising:

an airborne wireless radio for originating the radio signals and receiving the communication signals and selecting the second base station in response to the quality level of the second base station's communication signal; and an airborne wireless repeater for repeating the radio signals to the ground based subsystem.

2. The communications system of claim 1 wherein the airborne wireless radio transmits and receives code division multiple access (CDMA) signals.

3. The communications system of claim 1 wherein the plurality of base stations are coupled to the PSTN through a mobile switching center.

4. A communications system comprising:

a code division multiple access (CDMA) ground based subsystem comprising:

a plurality of base stations for transmitting communication signals having a quality level and receiving radio signals from an airborne based subsystem, the plurality of base stations being coupled to a public switched telephone network (PSTN);

the airborne based subsystem for transmitting the radio signals to, and receiving the communication signals from, a first base station of said plurality of base stations, and if the quality level of said first base station's communication signal is less than a predetermined amount, transmitting the radio signals to, and receiving the communication signals from, a second base station of said plurality of base stations, the airborne based subsystem comprising:

an airborne radiotelephone for originating the radio signals and receiving the communication signals; and an airborne base station for registering the airborne radiotelephone with the ground based subsystem and relaying the communication signals to the airborne radiotelephone and the radio signals to the ground based subsystem.

5. The communications system of claim 4 wherein the airborne radiotelephone selects the second base station in response to the quality level of the second base station's communication signal.

6. The communications system of claim 4 wherein the airborne base station selects the second base station in response to the quality level of the second base station's communication signal.

7. A method for communicating in a wireless communications system comprising a ground based subsystem and an airborne based subsystem, the ground based subsystem having a plurality of base stations, each base station transmitting a pilot signal, the airborne based subsystem having a radiotelephone that transfers signals to and from an airborne base station, the method comprising the steps of:

the radiotelephone registering with the airborne base station;

the ail;borne base station detecting the pilot signals from the plurality of ground base stations;

the airborne base station registering the radiotelephone with a first ground base station of the plurality of base stations in response to a quality indication of the first ground base station's pilot signal;

the airborne base station relaying signals between the radiotelephone and the first ground base station;

if the quality indication of the pilot signal is less than a predetermined threshold, the airborne base station detecting the pilot signals from the plurality of ground base stations; and if the quality indication of the pilot signal is less than a predetermined threshold, the airborne base station registering the radiotelephone with a second ground base station of the plurality of base stations in response to the quality indication of the second ground base station's pilot signal.

\* \* \* \* \*